US006499750B1

United States Patent
Michelau

(10) Patent No.: US 6,499,750 B1
(45) Date of Patent: Dec. 31, 2002

(54) WAGON WITH IMPROVED HANDLE ATTACHMENT ARRANGEMENT

(75) Inventor: Frederick J. Michelau, Des Plaines, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 09/931,483

(22) Filed: Aug. 16, 2001

(51) Int. Cl.⁷ .................................................. B62B 11/00
(52) U.S. Cl. .................................. 280/87.01; 280/47.34
(58) Field of Search ......................... 280/87.01, 87.021, 280/47.34, 47.38, 47.36, 47.371; 16/260, 261, 262, 266, 267, 408, 110.1

(56) References Cited

U.S. PATENT DOCUMENTS

| | | | |
|---|---|---|---|
| 2,734,222 A | * | 2/1956 | Yoneo Kiba .................. 16/261 |
| 3,809,435 A | | 5/1974 | Morris |
| 3,952,369 A | * | 4/1976 | Erickson ...................... 16/266 |
| 4,222,582 A | * | 9/1980 | Tonelli et al. ......... 280/87.021 |
| 4,963,115 A | | 10/1990 | Stowell |
| 5,358,314 A | | 10/1994 | Spadotto |
| 5,538,267 A | * | 7/1996 | Pasin et al. .............. 280/87.01 |
| 5,669,617 A | | 9/1997 | Pasin |
| 5,947,493 A | | 9/1999 | Pasin et al. |
| 6,176,759 B1 | | 1/2001 | Trageser |
| 6,186,524 B1 | | 2/2001 | McQueeny et al. |

* cited by examiner

Primary Examiner—Brian L. Johnson
Assistant Examiner—Bryan Fischmann
(74) Attorney, Agent, or Firm—Piper Rudnick

(57) ABSTRACT

A wagon features a plastic body, bolster and handle. The bolster is pivotally mounted to the bottom of the wagon body and receives an axle to which the front wheels are attached. The rear wheels are mounted to the bottom under the back portion of the wagon. The bolster features a number of spaced prongs, each of which includes an aperture. Some of the apertures are surrounded by channels including arcuate surfaces. The wagon handle features a number of spaced fingers, each of which includes an aperture. Some of the apertures are surrounded by bosses featuring circumferential walls. The fingers of the handle are placed between the prongs of the bolster with the bosses positioned within the channels so that the boss circumferential walls engage the channel arcuate surfaces as the wagon is pulled by its handle. A hinge pin is received through the handle and bolster apertures so that the handle and bolster are joined in a hinged fashion.

20 Claims, 8 Drawing Sheets

WAGON WITH IMPROVED HANDLE ATTACHMENT ARRANGEMENT

BACKGROUND OF THE INVENTION

This invention relates in general to wagons, and more particularly, to an improved arrangement for attaching a handle to a wagon constructed of plastic.

Wagons are used by adults to move and carry things and are also used by children as toys. A wagon typically includes a body that is supported upon rolling wheels. A typical wagon also includes a handle for pulling and steering the wagon. The handle has two ends, the first of which features a hand grip. The second end of the handle connects to the wagon in a hinged fashion.

The body of a wagon typically includes a platform surrounded by front, rear and side walls. Wagon bodies have traditionally been constructed of metal or wood or combinations thereof. Recently, however, wagon bodies have been constructed from molded plastic, such as high density polyethylene or some similar material. Such wagons are becoming increasingly popular because of their light weight, durability, corrosion resistance, and lower manufacturing cost.

Often, with traditional steel and/or wood bodied wagons, the front wheels and handle of the wagon are attached to a bolster that is pivotally connected to the bottom of the wagon body. With such an arrangement, the hinged handle may be pivoted between a position whereby the wagon may be pulled and steered and a position whereby a child riding in the wagon may steer the wagon, such as when being pushed or coasting down a hill. Such a configuration has been recently applied to plastic-bodied wagons. Further weight, strength and cost benefits occur if the handle and bolster are also constructed from plastic.

A number of plastic-body wagon designs do not feature bolsters. An example of such a wagon is presented in commonly owned U.S. Pat. No. 5,669,617 to Pasin et al. As illustrated in FIGS. 1 and 2, the wagon of the Pasin et al. '617 patent features a plastic body, indicated in general at 10, with prongs 12a, 12b and 12c formed upon the exterior surface of its front 13. The handle 14 of the wagon is also constructed of plastic and features a pair of fingers 16a and 16b that are positioned between the prongs 12a, 12b and 12c of the wagon body in the manner illustrated in FIGS. 1 and 2. A metal rod or hinge pin 18 secures the handle fingers to the wagon body prongs in a hinged fashion. The front wheels of the wagon, indicated at 22a and 22b, are pivotally connected to the wagon body 10 by swiveling front axles 24a and 24b.

While plastic wagons, such as the ones described above, offer advantages over metal or wood wagons, there is an issue of wear that occurs at the connection between the plastic handle and plastic wagon body or bolster. As described with reference to the wagon of the Pasin et al. '617 patent, the plastic handle of a wagon is typically secured to the plastic wagon body or bolster with a metal pin. More specifically, the wagon handle is essentially hollow with apertures formed through its walls. The plastic body or bolster is also essentially hollow and has apertures formed through its walls that align with the apertures formed in the handle when the two components are assembled in the manner shown in FIGS. 1 and 2. The metal pin passes through the aligned apertures of the handle and body or bolster so that the handle is secured to the body or bolster in a hinged fashion.

When the wagon is pulled, however, the bolster or body and handle are urged apart so that the metal pin is forced against the edges of the apertures of each. As a result, the portions of the thin plastic walls surrounding the apertures are strained. The reoccurring forces and resulting strain may cause the apertures to eventually stretch so as to become elongated. This results in significant and undesirable play in the hinged connection between the handle and body or bolster. In some instances, the stretching may be so severe that the plastic surrounding any of the apertures actually tears.

Accordingly, it is an object of the present invention to provide an improved arrangement for connecting a handle to a plastic-bodied wagon that minimizes or eliminates stretching of the plastic surrounding the handle and/or body or bolster connecting apertures.

It is another object of the present invention to provide an improved arrangement for connecting a handle to a plastic-bodied wagon that eliminates tearing of the plastic surrounding handle and/or body or bolster connecting apertures.

It is another object of the present invention to provide a wagon with a durable and secure handle attachment arrangement.

It is still another object of the present invention to provide a wagon with a handle attachment arrangement that offers ease of assembly.

It is still another object of the present invention to provide a wagon with a handle attachment arrangement that is economical to manufacture.

Other objects and advantages will be apparent from the remaining portion of this specification.

SUMMARY OF THE INVENTION

The present invention is directed to a wagon having a plastic body supported upon a pair of front wheels and a pair of rear wheels. A plastic bolster is pivotally attached to the bottom of the wagon and receives the axle upon which the front wheels are mounted. The bolster is equipped with a number of spaced prongs, each having an aperture formed therein with some of the apertures surrounded by channels including arcuate surfaces.

The wagon also features a plastic handle having a number of spaced fingers with apertures formed therein. Bosses surround some of the apertures and feature circumferential walls. The fingers of the handle are inserted between the prongs of the bolster so that the finger bosses enter the prong channels until the circumferential walls of the bosses engage the arcuate surfaces of the channels. With the handle and bolster thus configured, the apertures of the handle fingers align with the apertures of the bolster prongs. A hinge pin is inserted through the aligned apertures so that a hinge is formed permitting the handle to rotate with respect to the bolster. When the handle of the wagon is pulled, forces are distributed over the interface between the boss circumferential walls and the channel arcuate surfaces. As a result, the stress exerted by the hinge pin on the plastic surrounding the apertures is significantly reduced. The arrangement of the present invention may also be implemented with a wagon that has the handle directly attached to the front of the wagon body.

The following detailed description of embodiments of the invention, taken in conjunction with the appended claims and accompanying drawings, provide a more complete understanding of the nature and scope of the invention.

DETAILED DESCRIPTION OF THE INVENTION

Figure 3:
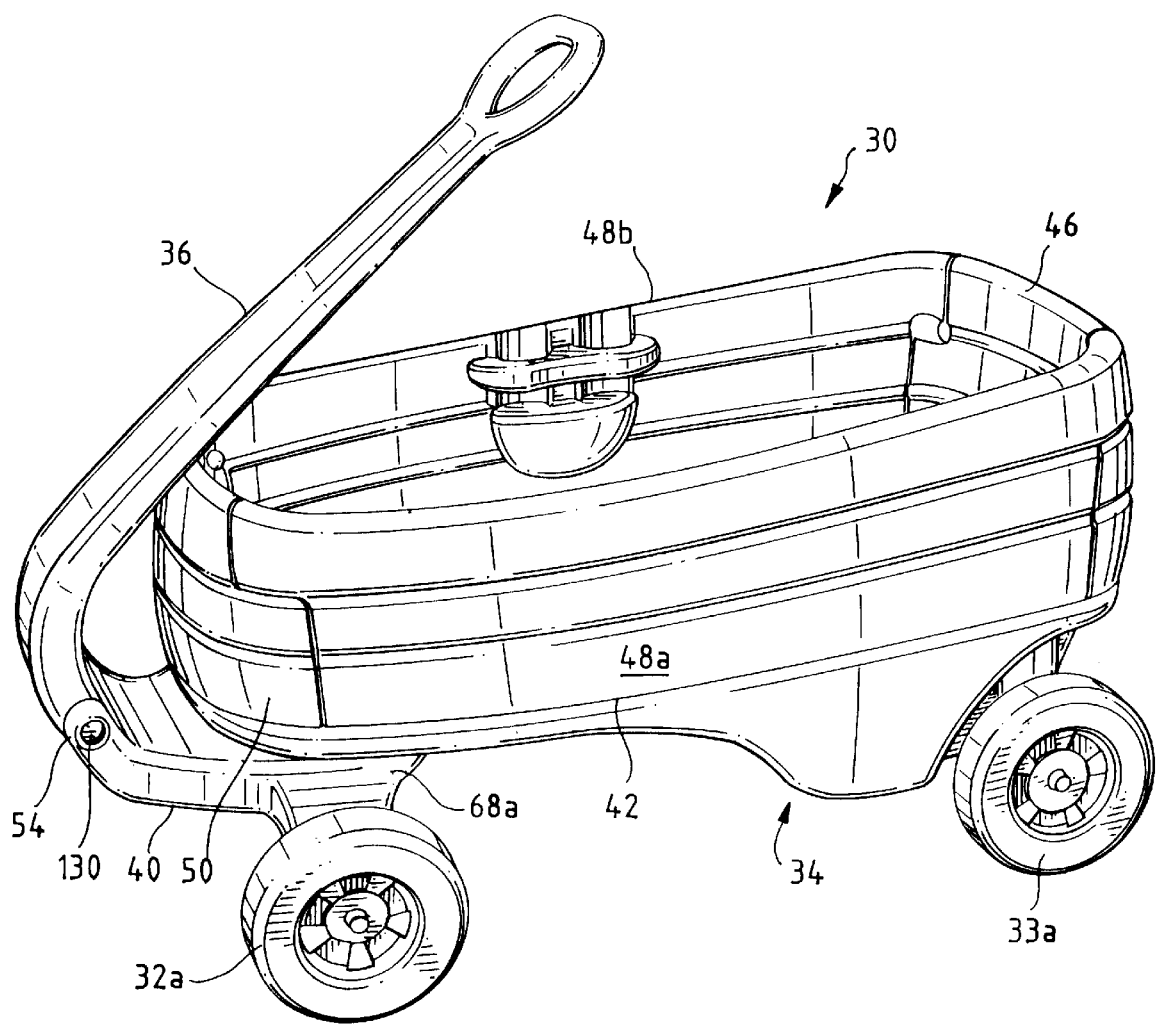
FIG. 3 is a perspective view of a child's wagon constructed in accordance with the present invention.

A children's wagon constructed in accordance with the present invention is indicated in general at 30 in FIG. 3. The wagon features a pair of front wheels 32a and 32b, a pair of rear wheels 33a and 33b, a wagon body indicated in general at 34, a pulling and steering handle 36 and a front bolster 40. The wagon body 34 defines a horizontally disposed supporting surface 42 preferably to which a back wall 46, side walls 48a and 48b, and front wall 50 are removably mounted. In the preferred form of the invention, the wagon body and the front, rear and side walls are all formed of molded plastic. The handle 36 is pivotally connected to the front bolster 40 via a hinge 54. The hinge 54 will be explained in greater detail below. The bolster and handle are also preferably constructed from molded plastic.

Figure 4:
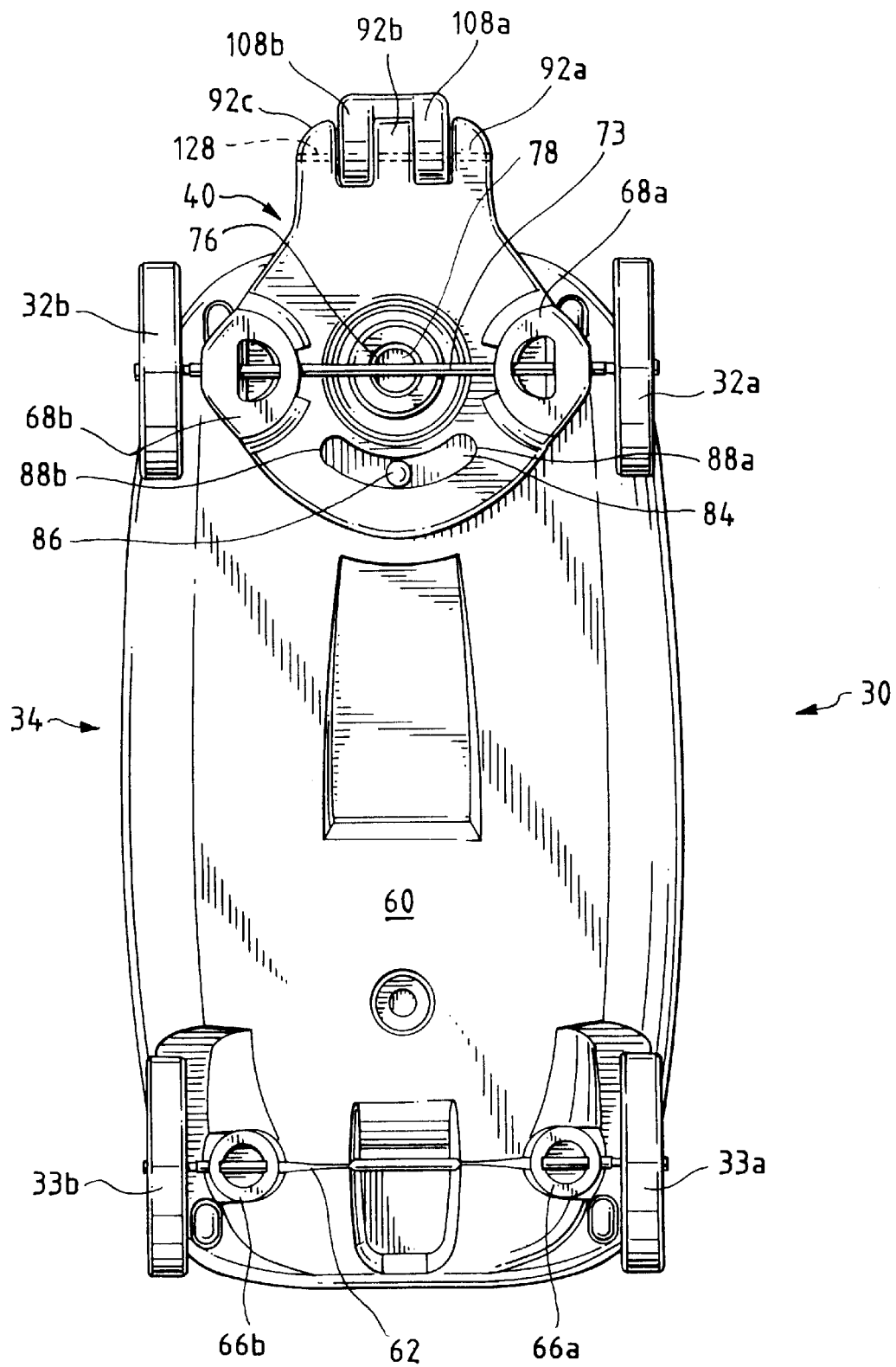
FIG. 4 is a bottom plan view of the wagon of FIG. 3.

As illustrated in FIG. 4, the wagon's rear wheels 33a and 33b may be mounted to the bottom 60 of the wagon body 34 via an axle 62 and an optional suspension arrangement. More specifically, the axle is optionally attached to coil springs 66a and 66b which are received within plastic cups that are molded into the bottom 60 of the wagon body 34. For additional details regarding this suspension arrangement, reference is made to commonly owned, copending U.S. patent application Ser. No. 09/621,996 (Filed Jul. 21, 2000).

The bolster, indicated in general at 40 in FIG. 4, features a pair of downwardly-extending legs 68a and 68b which receive a front axle 73 to which the wagon's front wheels 32a and 32bare mounted. A bore 76 is formed in the bolster so that it may be pivotally attached to the bottom of the wagon body via knob 78. The knob may be integrally formed upon the bottom of the wagon or may be attached as a separate piece. The knob may be made out of plastic or metal and may alternatively take the form of a rivet or bolt.

Figure 5:
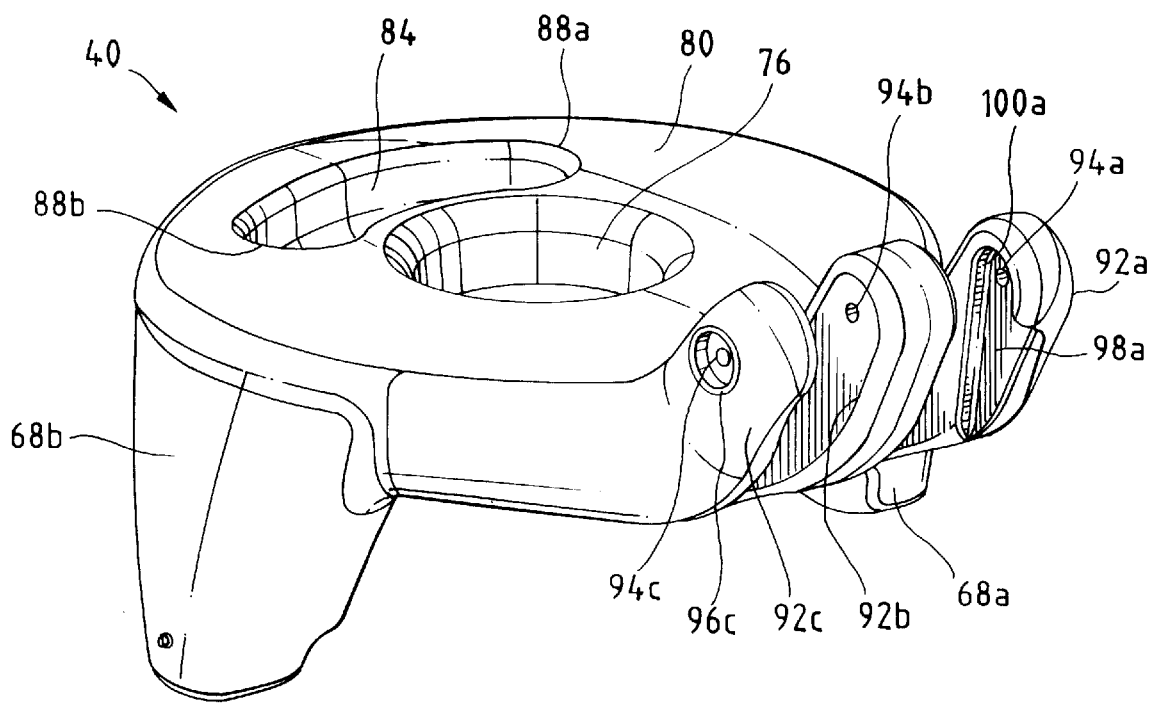
FIG. 5 is an enlarged perspective view illustrating the bolster of the wagon of FIG. 3.

An enlarged view of the bolster without the wagon handle or front axle attached is illustrated in FIG. 5. The bolster 40 features a central section 80 within which an arc shaped aperture 84 and the round bore 76 are formed. As described previously, the round bore receives the knob, rivet or bolt (78 in FIG. 4) that secures the bolster to the bottom of the wagon in a pivoting fashion. As illustrated in FIG. 4, when the bolster is attached to the wagon, the arc shaped aperture 84 receives a pin or stop 86 which extends from the bottom of the wagon. The stop 86 engages the ends 88a and 88b of the arc shaped aperture 84 to limit the travel or turning of the bolster 40 so as to prevent the wagon from tipping. As described in commonly owned U.S. Pat. No. 6,186,524 to McQueeney et al., the stop 86 may optionally be retractable so that the bolster may be rotated approximately 180 degrees from its normal position to enable the positioning of handle 36 (FIGS. 1 and 6) under the wagon body for ease of transport and storage.

Figure 7:
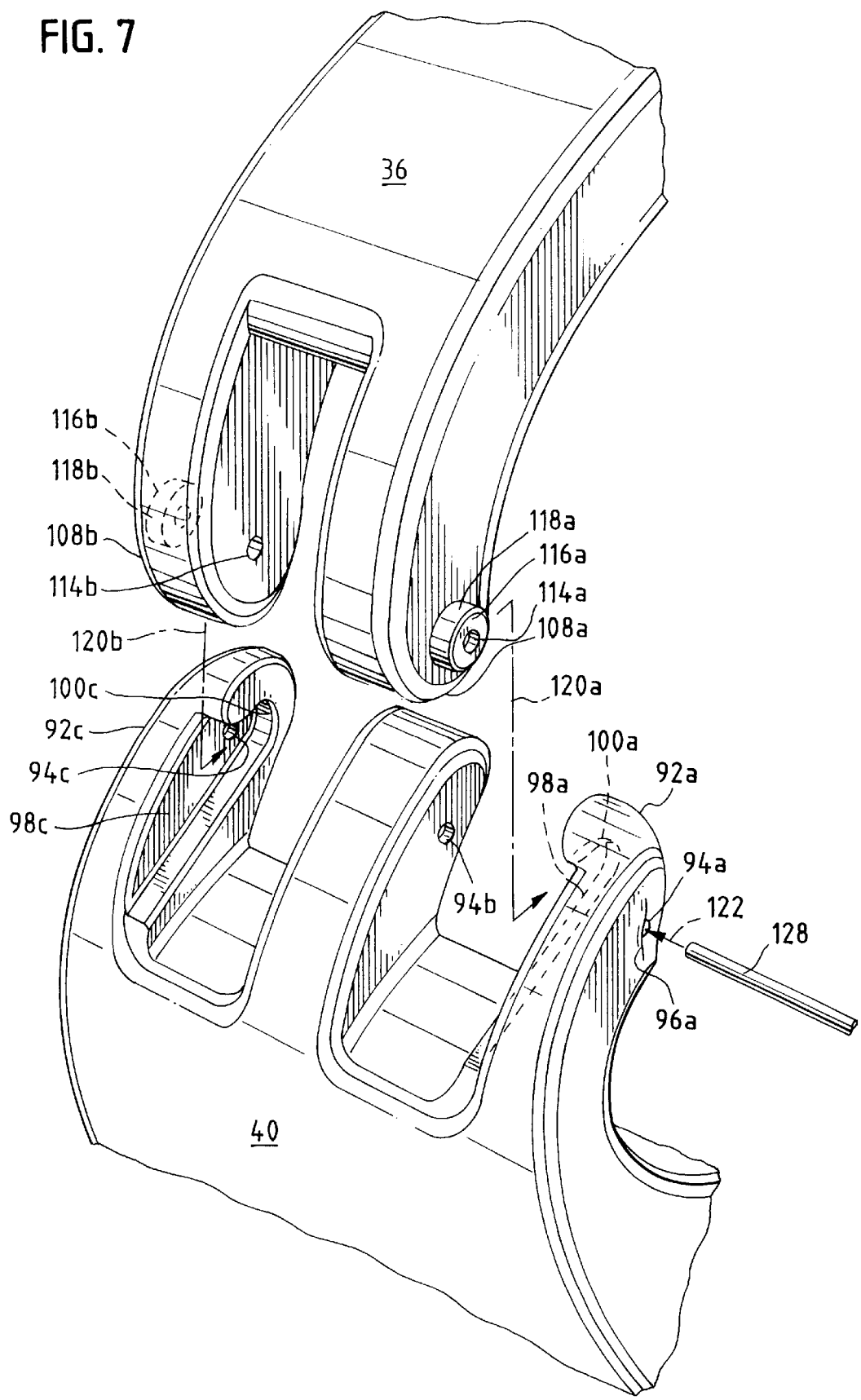
FIG. 7 is an exploded view of a portion of the bolster, a portion of the handle and the hinge pin of the wagon of FIG. 3.

Three spaced prongs 92a, 92b and 92c are formed upon, or attached to, the central section 80 of the bolster 40. The three prongs 92a, 92b, and 92c feature apertures 94a, 94b and 94c. A semi-circular indentation 96c is formed on the outward-facing surface of the prong 92c surrounding aperture 94c. A similar semi-circular indentation is formed on the outward-facing side of prong 92c, as illustrated in FIG. 7 at 96a. A channel formation 98a is positioned within the inward-facing surface of prong 92a and terminates in arcuate surface 100a. As illustrated in FIG. 7, a similar channel formation 98c is positioned in the inward-facing side of prong 92c and features arcuate surface 100c.

Figure 6:
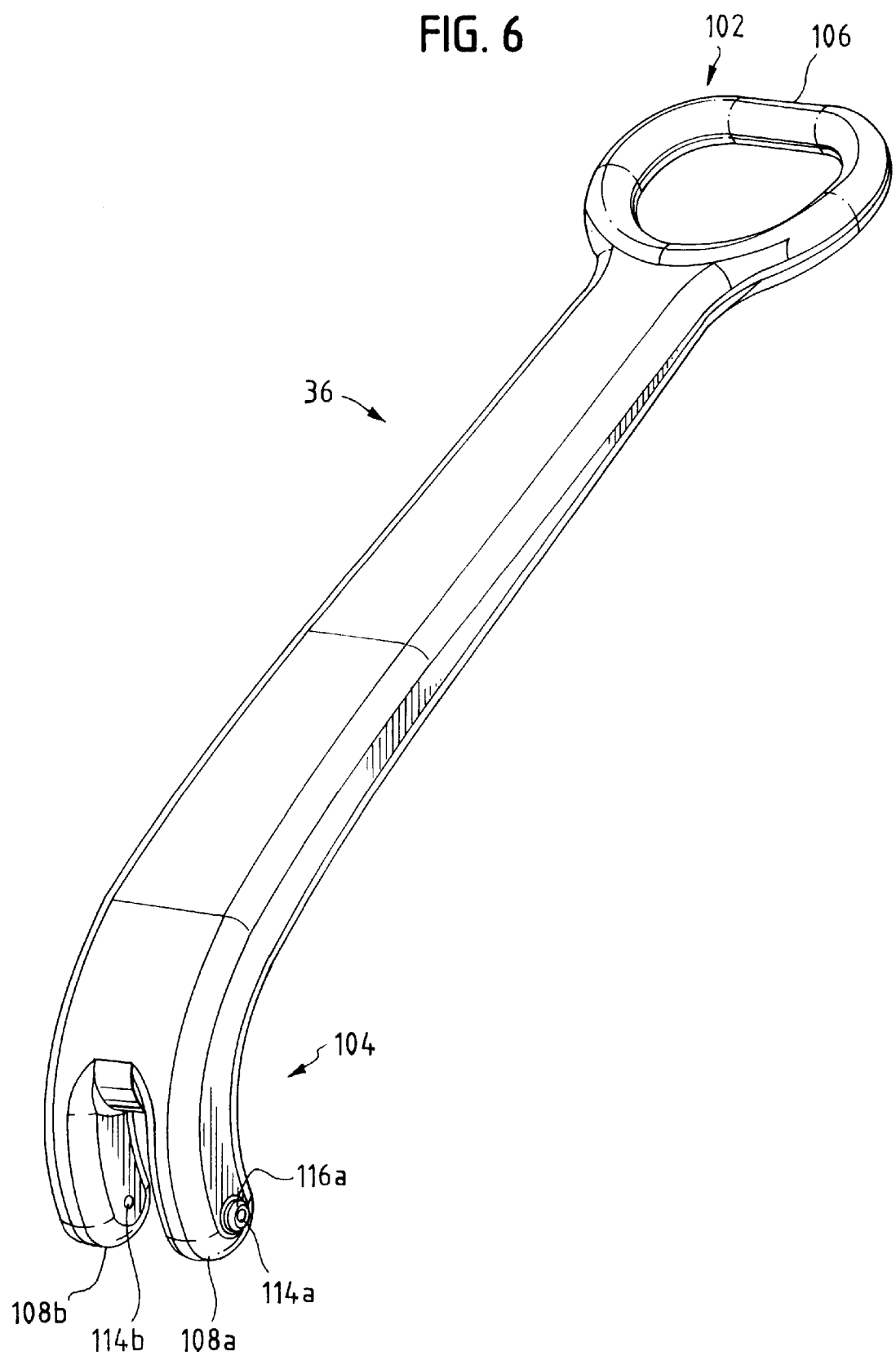
FIG. 6 is an enlarged perspective view of the handle of the wagon of FIG. 3.

As illustrated in FIG. 6, the wagon handle, indicated in general at 36, includes a distal end portion, indicated in general at 102, and a proximal end portion, indicated in general at 104. The distal end portion 102 includes a grip 106 that forms a ring for easy gripping by a child or adult. The proximal end portion 104 features a spaced pair of fingers 108a and 108b. The fingers 108a and 108b have aligned apertures, 114a and 114b, respectively, formed therein. A boss formation 116a is positioned upon the outward-facing side of finger 108a so as to surround aperture 114a and, as illustrated in FIG. 7, includes a circumferential wall 118a. As illustrated in FIG. 7, a similar boss formation 116b, is positioned upon the outward-facing side of finger 108b and includes a circumferential wall 118b.

FIG. 7 illustrates how the handle 36 is attached to the bolster 40 in accordance with the present invention. As indicated by arrows 120a and 120b, the fingers 108a and 108b of the handle 36 are inserted between the prongs 92a, 92b and 92c of the bolster 40 so that the bosses 116a and 116b of the handle fingers enter the channels 98a and 98c of the bolster prongs until the circumferential walls 118a and 118b of the bosses engage the arcuate surfaces 100a and 100cof the channels. With the handle fingers and bolster prongs thus configured, the apertures 114a and 114b of the handle fingers align with the apertures 94a, 94b and 94c of the bolster.

Figure 8:
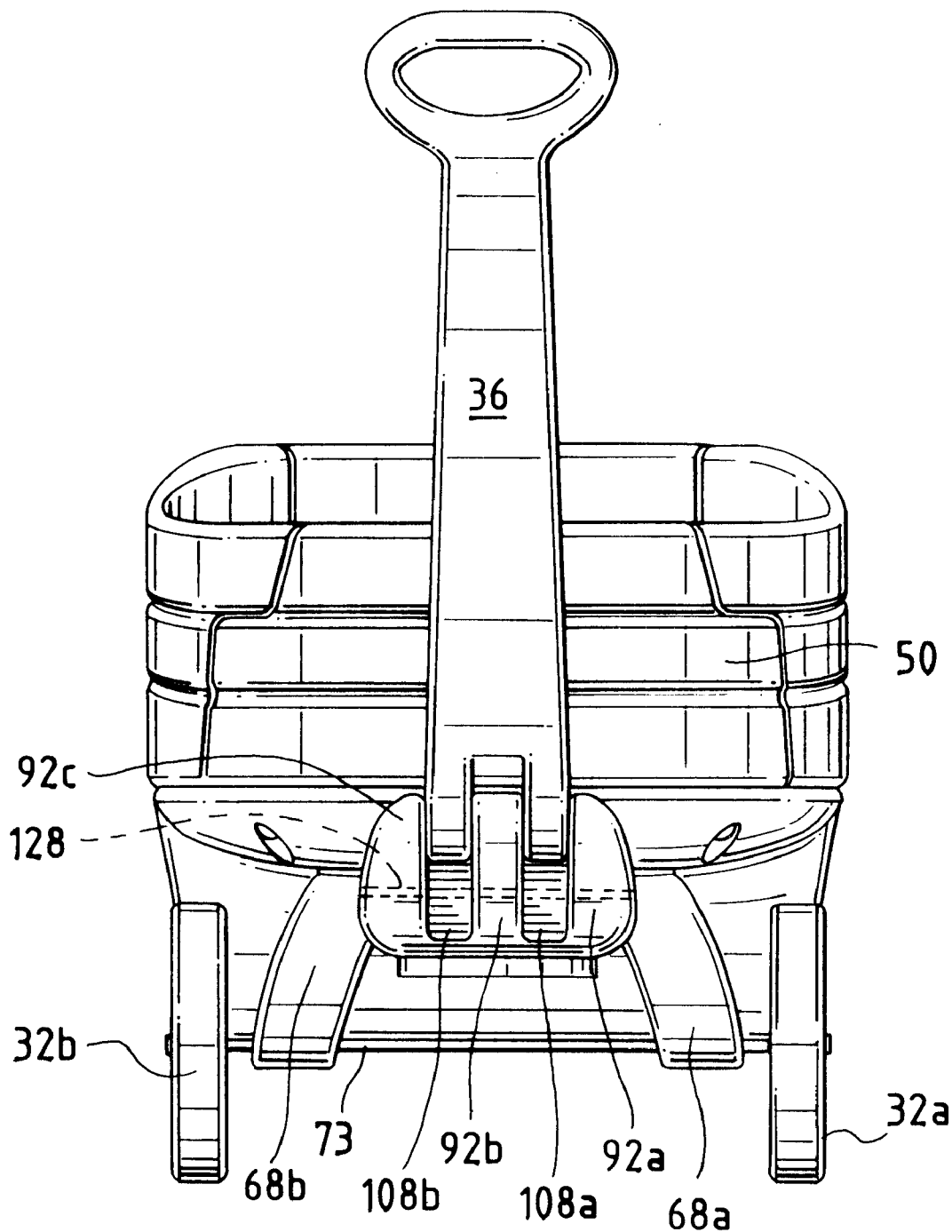
FIG. 8 is a front elevational view of the wagon of FIG. 3.

Next, as indicated by arrow 122 in FIG. 7, a hinge pin 128 is inserted through the aligned bolster prong apertures 94a, 94b, and 94c and handle finger apertures 114a and 114b. The hinge pin 128 is preferably made of metal, but can also be made from an alternative rigid and durable material. In addition, a screw, or some other type of elongated fastener may be substituted for hinge pin 128. As illustrated in FIGS. 4 and 8, the installed hinge pin 128 passes through the prongs 92a, 92b and 92c of the bolster and the fingers 108a and 108b of the handle so that a hinge (indicated at 54 in FIG. 1) is formed permitting the handle to rotate with respect to the bolster. As illustrated in FIG. 3, caps 130 are placed on the ends of the hinge pin 128. The caps are received within the semi-circular indentations 96a and 96c illustrated in FIGS. 7 and 5, respectively.

With reference to FIG. 7, the stress or forces placed upon the plastic surrounding bolster prong apertures 94a, 94b and 94c and handle finger apertures 114a and 114b by hinge pin 128 is significantly reduced due to the presence and interaction of the handle bosses 116a and 116b and the bolster channels 98a and 98c. More specifically, when the wagon is pulled by its handle 36, the boss circumferential side walls 118a and 118b engage the channel arcuate surfaces 100a and 100c so that the forces acting on the junction between the handle and bolster are distributed over the interface between the boss circumferential side walls and the channel arcuate surfaces. As a result, less stress is placed upon the plastic surrounding the bolster prong and handle finger apertures by the hinge pin 128 so that strain, stretching and tearing in those areas is virtually eliminated.

Figure 9:
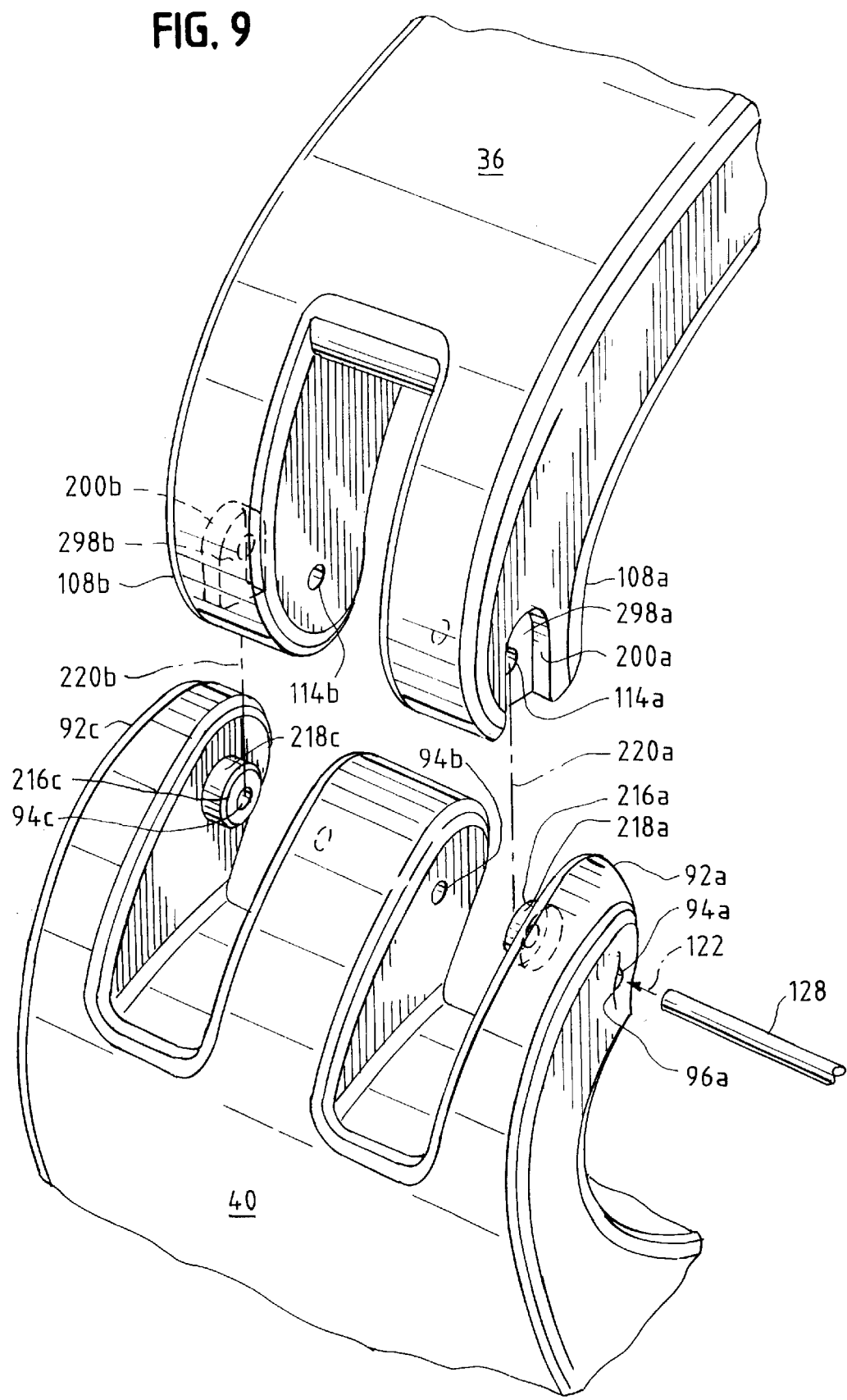
FIG. 9 is an exploded view of a portion of the bolster, a portion of the handle and the hinge pin of a second embodiment of the handle attachment arrangement of the present invention.

It should be noted that while the bosses are shown on the outward-facing surfaces of the handle fingers and the channels are shown in the inward-facing surfaces of the bolster prongs, the positions of the bosses and channels could be exchanged, as illustrated in FIG. 9. In FIG. 9, the bosses positioned on prongs 92a and 92c are indicated at 216a and 216c, respectively, and feature circumferential walls 218a and 218c. The channels positioned within fingers 108a and 108b are illustrated at 298a and 298b, respectively, and feature arcuate surfaces 200a and 200b. Arrows 220a and 220b illustrate the insertion of the fingers of handle 36 between the prongs of bolster 40 so that the bosses 216a and 216c of the prongs enter the channels 298a and 298b of the fingers.

The channels and bosses could also be positioned on different fleers and bolsters than those illustrated. In addition, while two handle fingers and three bolster prongs are illustrated, a different number of each could be used in practicing the invention. Indeed, additional handle fingers and bolster prongs could be added to increase the strength of the resulting hinge even further.

Figure 1:
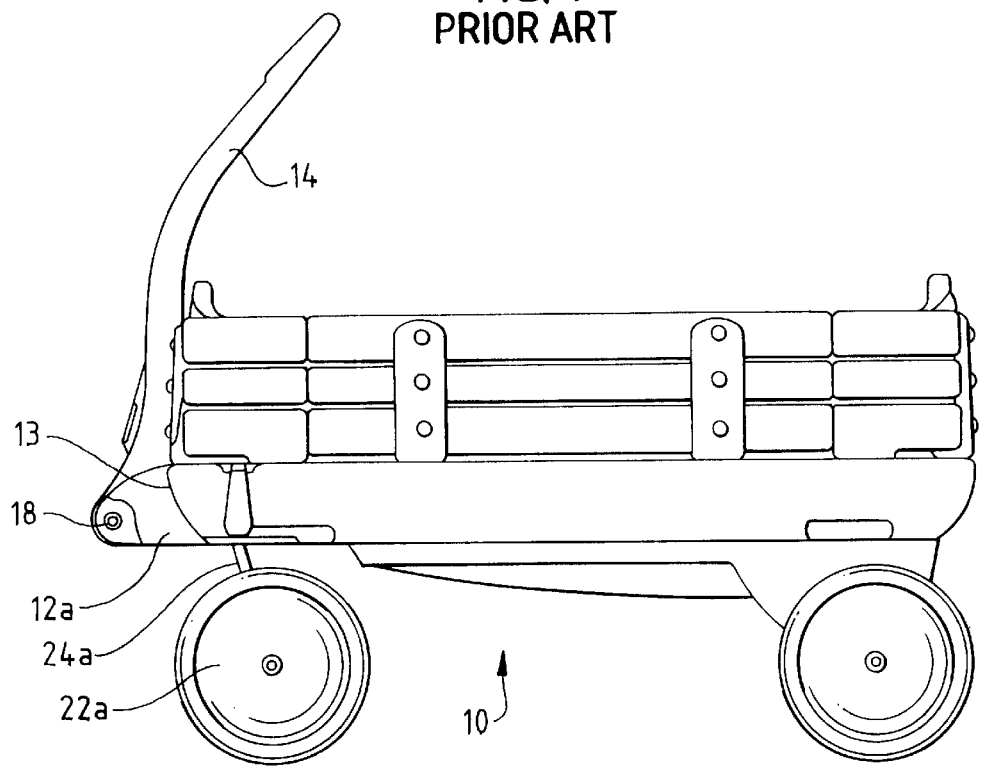
FIG. 1 is a side elevational view of a prior art child's wagon that may be equipped with the handle attachment arrangement of the present invention.
Figure 2:
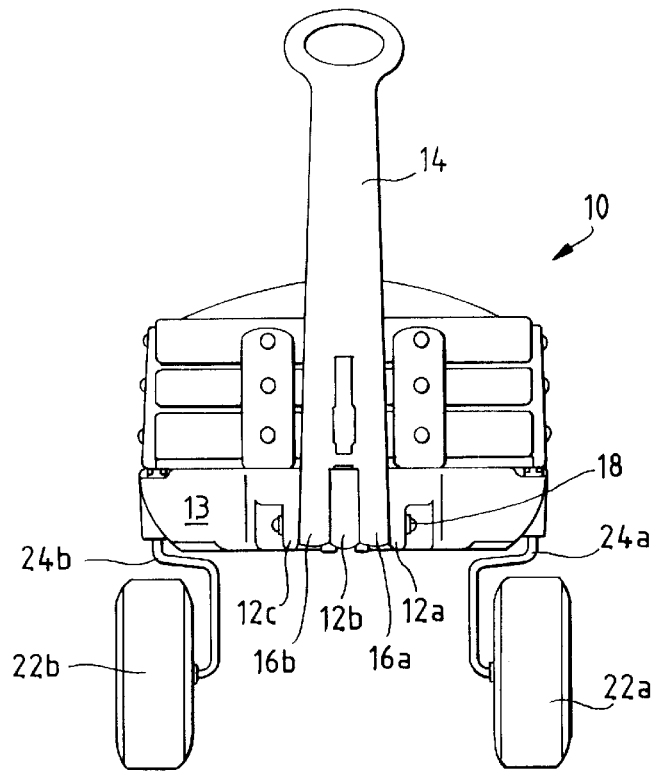
FIG. 2 is a front elevational view of the wagon of FIG. 1.

It should also be noted that the present invention could be applied to the wagon illustrated in FIGS. 1 and 2. That is, the fingers 16a and 16b of the wagon handle 14 of FIGS. 1 and 2 could be equipped with bosses such as those illustrated in FIG. 7 while the prongs 12a and 12c formed upon the front 13 of the wagon body 10 of FIGS. 1 and 2 could be equipped with channels such as those illustrated at 98a and 98c in FIG. 7.

While the preferred embodiments of the invention have been shown and described, it will be apparent to those skilled in the art that changes and modifications may be made without departing from the spirit of the invention, the scope of which is defined by the appended claims.

What is claimed is:

1. A wagon comprising:
   a) a body having a plurality of wheels attached thereto;
   b) at least one prong connected to the body and having an aperture therethrough with a channel surrounding the aperture;
   c) a handle featuring at least one finger, said at least one finger having an aperture therethrough with a boss surrounding the aperture;
   d) a hinge pin sized to pass through the apertures of said at least one prong and said at least one finger; and
   e) said at least one prong and said at least one finger positioned adjacent to one another with said hinge pin positioned through the apertures of each and the boss and channel of each in engagement with one another so that the handle is joined to the body in a hinged fashion.

2. The wagon of claim 1 wherein said boss includes a circumferential wall and said channel includes an arcuate surface, said circumferential wall of said boss engaging the arcuate surface of said channel when said handle is joined to the body in a hinged fashion.

3. The wagon of claim 1 wherein said body and said handle are constructed from plastic.

4. The wagon of claim 1 further comprising a bolster pivotally connected to a bottom of the wagon body with said at least one prong attached to the bolster.

5. The wagon of claim 4 wherein the body, handle and bolster are all constructed from plastic.

6. The wagon of claim 1 wherein said prongs are positioned upon a front of the body.

7. A wagon comprising:
   a) a body having a plurality of wheels attached thereto;
   b) at least one prong connected to the body and having an aperture therethrough with a channel surrounding the aperture;
   c) a handle featuring a proximal end, said proximal end having an aperture therethrough with a boss surrounding the aperture;
   d) a hinge pin sized to pass through the apertures of said at least one prong and the proximal end of said handle; and
   e) said at least one prong and said proximal end of said handle positioned adjacent to one another with said hinge pin positioned through the apertures of each and the channel and boss of each in engagement with one another so that the handle is joined to the body in a hinged fashion.

8. The wagon of claim 7 wherein said boss includes a circumferential wall and said channel includes an arcuate surface, said circumferential wall of said boss engaging the arcuate surface of said channel when said handle is joined to the body in a hinged fashion.

9. The wagon of claim 7 wherein said body and said handle are constructed from plastic.

10. The wagon of claim 7 further comprising a bolster pivotally connected to a bottom of the wagon body with said at least one prong attached to the bolster.

11. The wagon of claim 10 wherein the body, handle and bolster are all constructed from plastic.

12. The wagon of claim 7 wherein said prongs are positioned upon a front of the body.

13. A method for attaching a handle to a wagon with a hinge pin comprising the steps of:
   a) providing a prong on the wagon;
   b) forming an aperture in the prong;
   c) creating a channel around the aperture of the prong;
   d) forming an aperture in the handle;
   e) creating a boss around the aperture of the handle;
   f) positioning the handle adjacent to the prong of the wagon;
   g) engaging the channel of the prong with the boss of the handle;
   h) aligning the aperture of the prong with the aperture of the handle; and
   i) inserting the hinge pin through the aligned prong and handle apertures so that the handle and wagon are joined in a hinged fashion with the prong channel and handle boss in engagement.

14. A wagon comprising:
   a) a body having a plurality of wheels attached thereto;
   b) at least one prong connected to the body and having an aperture therethrough with a boss surrounding the aperture;
   c) a handle featuring at least one finger, said at least one finger having an aperture therethrough with a channel surrounding the aperture;
   d) a hinge pin sized to pass through the apertures of said at least one prong and said at least one finger; and
   e) said at least one prong and said at least one finger positioned adjacent to one another with said hinge pin positioned through the apertures of each and the channel and boss of each in engagement with one another so that the handle is joined to the body in a hinged fashion.

15. The wagon of claim 14 wherein said boss includes a circumferential wall and said channel includes an arcuate surface, said circumferential wall of said boss engaging the arcuate surface of said channel when said handle is joined to the body in a hinged fashion.

16. The wagon of claim 14 further comprising a bolster pivotally connected to a bottom of the wagon body with said at least one prong attached to the bolster.

17. A wagon comprising:
   a) a body having a plurality of wheels attached thereto;
   b) at least one prong connected to the body and having an aperture therethrough with a boss surrounding the aperture;
   c) a handle featuring a proximal end, said proximal end having an aperture therethrough with a channel surrounding the aperture;
   d) a hinge pin sized to pass through the apertures of said at least one prong and the proximal end of said handle; and
   e) said at least one prong and said proximal end of said handle positioned adjacent to one another with said hinge pin positioned through the apertures of each and the boss and channel of each in engagement with one another so that the handle is joined to the body in a hinged fashion.

18. The wagon of claim 17 wherein said boss includes a circumferential wall and said channel includes an arcuate surface, said circumferential wall of said boss engaging the arcuate surface of said channel when said handle is joined to the body in a hinged fashion.

19. The wagon of claim 17 further comprising a bolster pivotally connected to a bottom of the wagon body with said at least one prong attached to the bolster.

20. A method for attaching a handle to a wagon with a hinge pin comprising the steps of:
   a) providing a prong on the wagon;
   b) forming an aperture in the prong;
   c) creating a boss around the aperture of the prong;
   d) forming an aperture in the handle;
   e) creating a channel around the aperture of the handle;
   f) positioning the handle adjacent to the prong of the wagon;
   g) engaging the channel of the handle with the boss of the prong;
   h) aligning the aperture of the prong with the aperture of the handle; and
   i) inserting the hinge pin through the aligned prong and handle apertures so that the handle and wagon are joined in a hinged fashion with the prong boss and handle channel in engagement.

\* \* \* \* \*